US009496964B2

United States Patent
Sinsky et al.

(10) Patent No.: US 9,496,964 B2
(45) Date of Patent: Nov. 15, 2016

(54) OPTOELECTRONIC EQUALIZER CIRCUIT

(71) Applicant: Alcatel-Lucent USA Inc., Murray Hill, NJ (US)

(72) Inventors: Jeffrey H. Sinsky, Marlboro, NJ (US); Chia-Ming Chang, Matawan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/658,415

(22) Filed: Mar. 16, 2015

(65) Prior Publication Data

US 2016/0277119 A1     Sep. 22, 2016

(51) Int. Cl.
H04B 10/00     (2013.01)
H04B 10/61     (2013.01)
H04J 14/00     (2006.01)

(52) U.S. Cl.
CPC .................................. *H04B 10/615* (2013.01)

(58) Field of Classification Search
CPC .............................................. H04B 10/25073
See application file for complete search history.

(56) References Cited

U.S. PATENT DOCUMENTS

| 6,956,991 | B2 | 10/2005 | Madsen | |
|---|---|---|---|---|
| 2003/0081291 | A1* | 5/2003 | Nishimura | H04B 10/2507 398/147 |
| 2006/0034614 | A1* | 2/2006 | Chen | H04B 10/2569 398/149 |

OTHER PUBLICATIONS

Gnauck, A. H., et al., "Optical Equalization of 42.7-Gbaud Band-Limited NRZDQPSK Signals for High-Spectral-Efficiency Transmission," Conference on Optical Fiber Communication and the National Fiber Optic Engineers Conference, 2007, OFC//NFOEC 2007, (3 pages).

Nguyen, Hoang Manh, et al., "PLC-based Tunable Optical Equalizer for 40-Gbps Intensity-Modulated Signal," Conference on Lasers & Electro Optics & The Pacific Rim Conference on Lasers and Electro-Optics, 2009, CLEO/PACIFIC RIM '09 (2 pages).

Bandyopadhyay, Saurav, et al., "Integrated TIA-Equalizer for High Speed Optical Link," 21st International Conference onVLSI Design, 2008, VLSID 2008, pp. 208-213.

Abiri, Behrooz, et al., "A Self-Equalizing Photo Detector," IEEE Photonics Conference (IPC), 2014, pp. 196-197.

* cited by examiner

*Primary Examiner* — Daniel Dobson
(74) *Attorney, Agent, or Firm* — Mendelsohn Dunleavy, P.C.; Yuri Gruzdkov

(57) ABSTRACT

We disclose an optoelectronic circuit that is configurable to operate as an FIR filter, in which the tapping and the weighting of the signal that is being equalized are performed in the optical domain, whereas the summation of the weighted signals is performed in the electrical domain after the corresponding optical signals are converted into electrical form using an array of photodetectors. Photodetectors in the array are arranged such that some of them contribute to the equalized electrical signal with a positive polarity and the others contribute to the equalized electrical signal with a negative polarity. As a result, at least some of the tap weights used in the FIR filter can be made variable between a positive value and a negative value.

20 Claims, 4 Drawing Sheets

200

400

OPTOELECTRONIC EQUALIZER CIRCUIT

BACKGROUND

1. Field

The present disclosure relates to optical communication equipment and, more specifically but not exclusively, to optoelectronic circuits.

2. Description of the Related Art

This section introduces aspects that may help facilitate a better understanding of the disclosure. Accordingly, the statements of this section are to be read in this light and are not to be understood as admissions about what is in the prior art or what is not in the prior art.

The next-generation of optical communication systems is being designed for relatively high data rates, e.g., higher than about 100 Gbit/s per channel. At these rates, the effects of bandwidth limitations of various components of the transmitter, fiber-optic channel, and/or receiver may significantly degrade the performance of optical transport links. One approach to dealing with these effects is to perform appropriate signal processing, e.g., signal equalization in the electrical digital domain, after the corresponding optical signal has been photo-detected and digitized at the receiver. This electrical digital-signal processing is typically implemented using a customized ASIC or DSP, which can be relatively expensive to design and/or make.

SUMMARY OF SOME SPECIFIC EMBODIMENTS

Disclosed herein are various embodiments of an optoelectronic circuit configurable to operate as a finite-impulse-response (FIR) filter, in which the tapping and the weighting of the signal that is being equalized are performed in the optical domain, whereas the summation of the weighted signals is performed in the electrical domain after the corresponding optical signals are converted into electrical form using an array of photodetectors. Photodetectors in the array are arranged such that some of the photodetectors contribute to the equalized electrical signal with a positive polarity and the others contribute to the equalized electrical signal with a negative polarity. As a result, at least some of the tap weights used in the FIR filter can be made variable between a positive value and a negative value.

In some embodiments, the disclosed optoelectronic circuit may advantageously be used to reduce the signal-processing load of and/or the signal-processing requirements to the receiver's electrical DSP.

According to one embodiment, provided is an apparatus comprising: an array of photodetectors; an optical splitter having an optical input port and a plurality of optical output ports, with each of the optical output ports being connected to illuminate a respective one of the photodetectors in the array of photodetectors; a bank of optical delay elements, with each of the optical delay elements being coupled between a respective one of the optical output ports and the respective one of the photodetectors such that light of each of the optical output ports passes through a respective one of the optical delay elements; and an array of variable optical-gain elements coupled between the optical splitter and the array of photodetectors such that, for at least some of the optical output ports, the light also passes through a respective one of the variable optical-gain elements. Each photodetector in the array of photodetectors is configured to convert received light into a respective electrical signal. The apparatus further comprises an electrical signal combiner configured to combine the respective electrical signals to generate an electrical output signal in a manner that causes a first subset of the photodetectors and a second subset of the photodetectors to contribute the respective electrical signals to the electrical output signal with opposite polarities.

According to another embodiment, provided is an apparatus comprising: an optical splitter having an optical input port and a plurality of optical output ports; an array of variable optical-gain elements, each coupled to receive light from a respective one of the optical output ports and configured to generate a respective attenuated or amplified light beam; a bank of optical delay elements, each connected to a respective one of the variable optical-gain elements and configured to delay the respective attenuated or amplified light beam by a respective delay time to produce a respective delayed light beam, wherein a set of the respective delay times has at least three different values; an array of photodetectors, each coupled to receive light from a respective one of the optical delay elements and configured to convert the respective delayed light beam into a respective electrical signal; and an electrical signal combiner configured to combine the respective electrical signals to generate an electrical output signal in a manner that causes a first subset of the photodetectors and a second subset of the photodetectors to contribute the respective electrical signals to the electrical output signal with opposite polarities.

According to yet another embodiment, provided is an apparatus comprising: an optical splitter having an optical input port and first and second optical output ports; a first variable optical-gain element coupled to receive light from the first optical output port and configured to generate a first attenuated or amplified light beam; a second variable optical-gain element coupled to receive light from the second optical output port and configured to generate a second attenuated or amplified light beam; a first optical delay element configured to delay the first attenuated or amplified light beam by a first delay time to produce a first delayed light beam; a second optical delay element configured to delay the second attenuated or amplified light beam by the first delay time to produce a second delayed light beam; a first photodetector configured to convert the first delayed light beam into a first electrical signal; a second photodetector configured to convert the second delayed light beam into a second electrical signal; and an electrical circuit configured to generate an electrical output signal using the first and second electrical signals, wherein the first and second electrical signals are combined with opposite polarities. The first and second variable optical-gain elements are tunable such that a combined contribution of the first and second electrical signals into the electrical output signal is variable between being positive and being negative.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

In an example embodiment, an optoelectronic circuit disclosed herein may be a part of the host optical receiver that enables the latter to perform at least some of the desired signal processing outside the receiver's electrical DSP. The signal processing implemented in the optoelectronic circuit can be used, e.g., to at least partially compensate the adverse effects of chromatic dispersion, polarization-mode dispersion, inter-symbol interference, and/or narrow passband filtering imposed on the received communication signal(s) by the various components of the transmitter, fiber-optic channel, and/or receiver. This capability may advantageously reduce the signal-processing load of and/or the signal-processing requirements to the receiver's electrical DSP.

Figure 1:
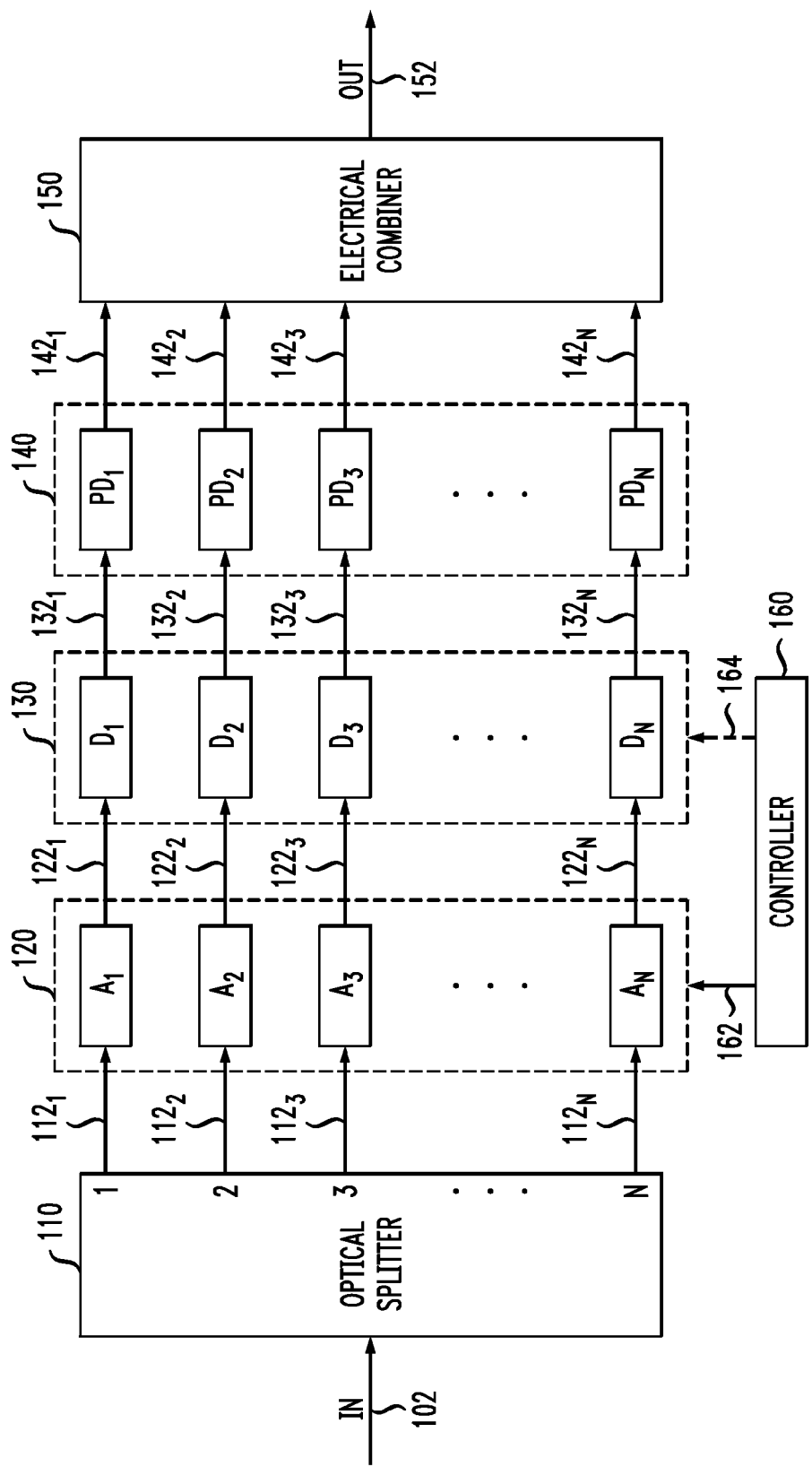
FIG. 1 shows a block diagram of an optoelectronic circuit according to an embodiment of the disclosure.

FIG. 1 shows a block diagram of an optoelectronic circuit 100 according to an embodiment of the disclosure. Circuit 100 is configured to receive an optical input signal 102 and convert this optical input signal into an electrical output signal 152, e.g., as further described below. Optical input signal 102 may be modulated with data using any suitable modulation format, such as NRZ (non-return-to-zero), PAM (pulse-amplitude modulation), QPSK (quadrature phase-shift keying), QAM (quadrature amplitude modulation), etc. Electrical output signal 152 may be an electrical analog signal that may be subjected to further conversion into an electrical digital form in an analog-to-digital converter (not explicitly shown in FIG. 1), e.g., for further processing in an electrical DSP (not explicitly shown in FIG. 1). In some embodiments, an electronic controller 160 may be used, e.g., as further explained below, to configure circuit 100 to operate as a finite impulse response (FIR) filter. As known in the relevant art, one or more FIR filters may be used to implement an adaptive signal equalizer for a communication system.

Circuit 100 comprises a 1×N optical splitter 110 configured to split optical input signal 102 into N (attenuated) copies $112_1$-$112_N$, where N is a positive integer greater than one. For illustration purposes and without any implied limitation, FIG. 1 shows an embodiment corresponding to N>3. In an example embodiment, splitter 110 may be an optical power splitter. In various embodiments, signal copies $112_1$-$112_N$ may have the same optical power (intensity) or different respective optical powers.

Signal copies $112_1$-$112_N$ produced by splitter 110 are applied to an array 120 of variable optical attenuators $A_1$-$A_N$ as indicated in FIG. 1. The attenuation applied by each of attenuators $A_1$-$A_N$ can be individually changed using a control signal 162 generated by controller 160. The attenuated optical signals produced by attenuators $A_1$-$A_N$ are labeled $122_1$-$122_N$.

Each of optical signals $122_1$-$122_N$ is applied to a respective one of delay elements (or delay lines) $D_1$-$D_N$ of an optical-delay bank 130. The delayed optical signals produced by delay elements $D_1$-$D_N$ are labeled $132_1$-$132_N$, respectively. In some embodiments, each of delay elements $D_1$-$D_N$ in optical-delay bank 130 may be a fixed delay element configured to apply a respective fixed delay time $\tau_n$ to a respective one of optical signals $122_1$-$122_N$, where n=1, 2, . . . , N. In some other embodiments, some or all of delay elements $D_1$-$D_N$ in optical-delay bank 130 may be individually tunable to apply a respective variable delay time $\tau_n$ to the respective one of optical signals $122_1$-$122_N$. In this case, the values of $\tau_n$ may be appropriately selected from the range of variability of the delay elements and then specified to the delay elements in optical-delay bank 130 by controller 160 via a control signal 164. Example tunable delay lines that can be used to implement variable delay elements $D_1$-$D_N$ are disclosed, e.g., in commonly owned U.S. Pat. No. 6,956,991, which is incorporated herein by reference in its entirety.

In various embodiments, the set T={$\tau_1$, $\tau_2$, . . . , $\tau_N$} of delay times used in optical-delay bank 130 may contain any desired number of distinct delay values. For example, in one embodiment, the set T may contain N distinct delay values. In an alternative embodiment, the set T may contain N/2 distinct delay values such that, for any delay time $\tau_j$, there is exactly one other delay time $\tau_k$ (where k≠j) of the same nominal value, i.e., $\tau_k$=$\tau_j$. A person of ordinary skill in the art will understand that, depending on the intended signal-processing function of circuit 100, other numbers of distinct delay values in the set T may also be used.

In some embodiments, some (e.g., at least one) of delay elements $D_1$-$D_N$ may be configured to introduce a delay time of a nominally zero value. As used herein the term "nominally zero" should be construed to mean that the corresponding delay time is much smaller (e.g., by a factor of ≥10) than the smallest of the other delay times in the set T. In general, any optical element (even a short straight piece of optical waveguide in an optical waveguide circuit) acts as a "delay element" because a light wave travels at a finite rate of speed and, as such, can only traverse an optical element in a finite amount of time, which is the "delay time" of that optical element.

Delayed optical signals $132_1$-$132_N$ produced by delay elements $D_1$-$D_N$ of optical-delay bank 130 are applied to an array 140 of photodetectors (e.g., photodiodes) $PD_1$-$PD_N$ where these optical signals are converted into the corresponding electrical signals (e.g., electrical currents) labeled $142_1$-$142_N$. An electrical signal combiner 150 then operates to combine electrical signals $142_1$-$142_N$, e.g., as further described below, to generate electrical output signal 152. Depending on the technology used to manufacture circuit 100, the circuit may have up to one hundred or even up to one thousand photodetectors in array 140 (e.g., N≤1000).

An important feature of electrical signal combiner 150 is that it is configured to combine electrical signals $142_1$-$142_N$ such that some of these signals contribute to electrical output signal 152 with a positive polarity, and the remainder of these signals contributes to electrical output signal 152 with a negative polarity. This property of electrical signal combiner 150 can be mathematically expressed, for example, as follows:

$$V_{152} = Z_0 \left( \sum_{n \in S^+} i_n - \sum_{n \in S^-} i_n \right) \quad (1)$$

where $V_{152}$ is the voltage of signal 152; $Z_0$ is the output impedance of electrical signal combiner 150; $i_n$ is the photocurrent generated by photodetector $PD_n$ (where n=1, 2, . . . , N); $S^+$ denotes the subset of the values of n corresponding to the photodetectors of array 140 that contribute to signal 152 with the positive polarity; and $S^-$ denotes the subset of the values of n corresponding to the photodetectors of array 140 that contribute to signal 152 with the negative polarity.

In various embodiments, subsets $S^+$ and $S^-$ may have the same number of elements or different respective numbers of elements.

In some embodiments, each or some of variable optical attenuators $A_1$-$A_N$ in array 120 may be replaced by the corresponding variable-gain optical amplifier(s), i.e., elements $A_1$-$A_N$ in array 120 can be more-generally characterized as variable optical-gain elements. A person of ordinary skill in the art will understand that, similar to variable optical attenuators, variable-gain optical amplifiers can provide means for controllably changing the values of filter-tap coefficients, e.g., using controller 160 and control signal 162, when circuit 100 is configured to operate as an FIR filter.

Hereafter, the term "variable optical-gain element" is used as a general term that covers both a variable optical attenuator and a variable-gain optical amplifier. For example, in one embodiment, a variable optical-gain element can be a variable optical attenuator. In this case, the variable optical gain of such "variable optical-gain element" is smaller than one. In an alternative embodiment, a variable optical-gain element can be a variable-gain optical amplifier. In this case, the variable optical gain of such "variable optical-gain element" is greater than one. For illustration purposes, the subsequent description of example embodiments is given in reference to variable optical attenuators. Based on the provided description, a person of ordinary skill in the art will understand how to make and use embodiments that employ variable-gain optical amplifier instead of or in addition to variable optical attenuators.

In some embodiments, array 120 may have fewer than N variable optical-gain elements. For example, in one alternative embodiment, array 120 may have N−1 variable optical-gain elements. In another alternative embodiment, array 120 may have N−2 variable optical-gain elements.

In some embodiments, the positions of array 120 and bank 130 in circuit 100 can be swapped. More specifically, in such embodiments, bank 130 is directly connected to splitter 110, and then array 120 is connected between bank 130 and array 140.

Figure 2:
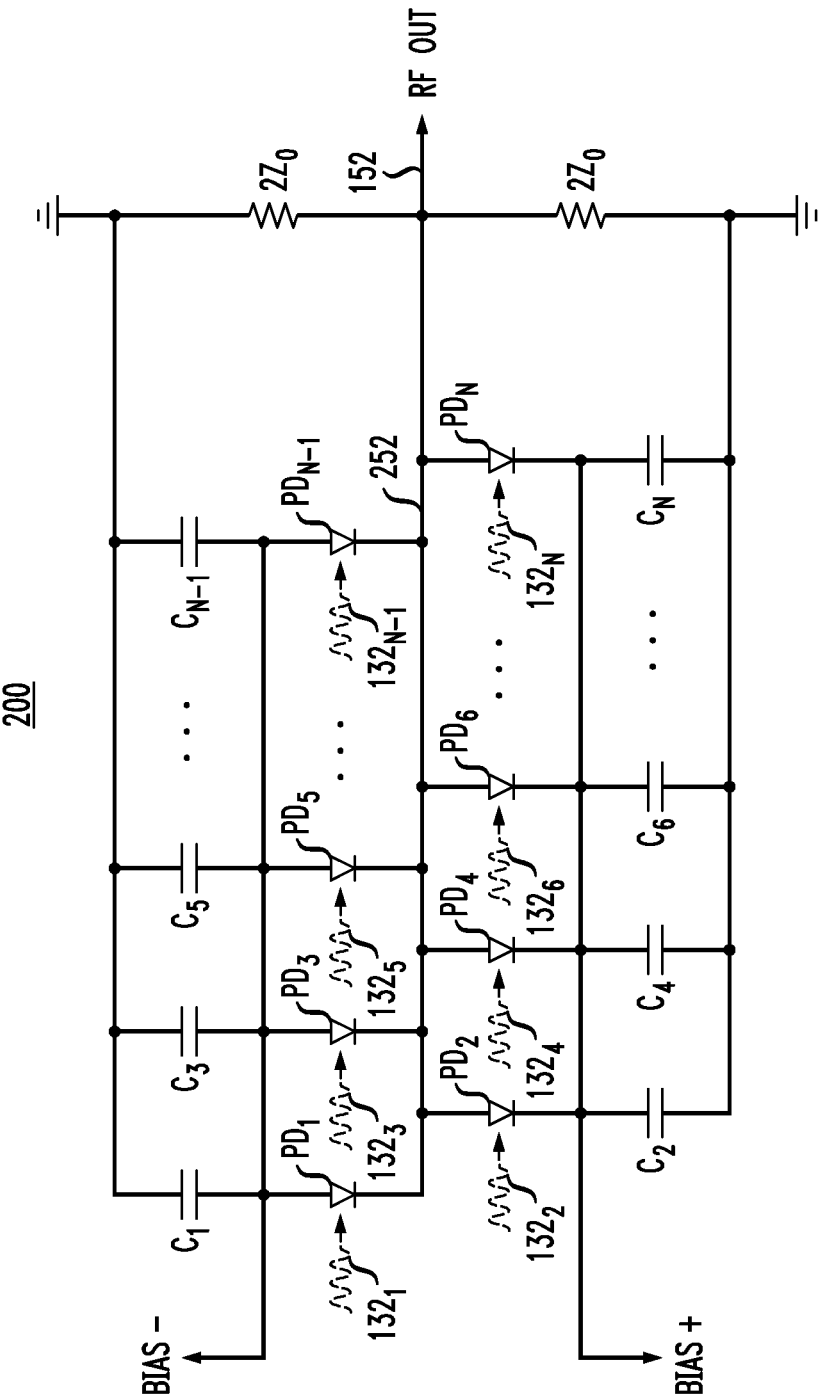
FIG. 2 shows a circuit diagram of an optoelectronic circuit that can be used in the optoelectronic circuit of FIG. 1 according to an embodiment of the disclosure.

FIG. 2 shows a circuit diagram of an optoelectronic circuit 200 that can be used in optoelectronic circuit 100 (FIG. 1) according to an embodiment of the disclosure. More specifically, circuit 200 may be used in place of photodetector array 140 and electrical signal combiner 150 (see FIG. 1). For illustration purposes and without any implied limitation, FIG. 2 shows an embodiment corresponding to N>7. Based on the provided description, a person of ordinary skill in the art will understand how to make and use other embodiments of circuit 200 corresponding to other values of N.

The N photodiodes $PD_1$-$PD_N$ in circuit 200 are all connected to a common electrical line 252 and configured to receive optical signals $132_2$-$132_N$, respectively (also see FIG. 1). Electrical line 252 is configured to collect the photocurrents generated by photodiodes $PD_2$-$PD_N$, and the resulting combined photocurrent causes output voltage $V_{152}$ to be generated at the output terminal (labeled 152) of circuit 200. Photodiodes $PD_1$-$PD_N$ are appropriately electrically biased and are electrically connected to capacitors $C_1$-$C_N$ as indicated in FIG. 2. The output impedance $Z_0$ (e.g., =50 Ohm) for circuit 200 may be achieved, for example, by having two resistors, each having the resistance of $2Z_0$, connected between common electrical line 252 and the ground terminals as further indicated in FIG. 2.

Photodiodes $PD_1$, $PD_3$, $PD_5$, ..., $PD_{N-1}$ in circuit 200 have their cathodes directly electrically connected to common electrical line 252 and, as such, draw the current from the common electrical line. Thus, each of photodiodes $PD_1$, $PD_3$, $PD_5$, ..., $PD_{N-1}$ is configured to contribute to output voltage $V_{152}$ with a negative polarity. In contrast, photodiodes $PD_2$, $PD_4$, $PD_6$, ..., $PD_N$ have their anodes directly electrically connected to common electrical line 252 and, as such, apply the current to the common electrical line. Thus, each of photodiodes $PD_2$, $PD_4$, $PD_6$, ..., $PD_N$ is configured to contribute to output voltage $V_{152}$ with a positive polarity. The output voltage $V_{152}$ generated by circuit 200 at output terminal 152 can be described by Eq. (1), wherein $S^+=\{2, 4, 6, ..., N\}$ and $S^-=\{1, 3, 5, ..., N-1\}$.

Capacitors $C_1$-$C_N$ are configured to provide an RF ground for the photodiodes. Since capacitors $C_1$, $C_3$, $C_5$, ..., $C_{N-1}$ are connected in parallel, in some embodiments, this array of capacitors can be realized using a single capacitor having the combined capacitance of these capacitors. One of the design specifications may be that the capacitive reactance of the array of smaller capacitors $C_1$, $C_3$, $C_5$, ..., $C_{N-1}$ or of the equivalent single larger capacitor is sufficiently small compared to the complex impedance of the photodiode array to provide a good RF return path for circuit 200. A similar description applies also to capacitors $C_2$, $C_4$, $C_6$, ..., $C_N$. In some embodiments, e.g., embodiments designed for handling communication signals having relatively long data-sequence lengths (e.g., PRBS-15 or greater), relatively large capacitors may be needed in place of capacitor banks ($C_1$, $C_3$, $C_5$, ..., $C_{N-1}$) and ($C_2$, $C_4$, $C_6$, ..., $C_N$) to enable circuit 200 to properly process the relatively low frequency components associated with such data-sequence lengths. In these embodiments, to obtain a desired capacitance, additional larger-size capacitors located off-chip may be connected in parallel to the on-chip capacitors shown in FIG. 2.

The use of the two resistors of resistance $2Z_0$, connected as indicated in FIG. 2, provide only one possible realization of electrical impedance matching of the array of photodiodes $PD_1$-$PD_N$ to the external system impedance. A person of ordinary skill in the art will understand that other impedance-matching schemes can also be used for this purpose. In general, impedance matching may be realized using any suitable combination of resistive and reactive components. Alternatively, in embodiments where the array of photodiodes $PD_1$-$PD_N$ is directly electrically connected to a transimpedance amplifier (not explicitly shown in FIG. 2), the impedance matching may not be needed at all, e.g., because circuit 200 can operate as an input-current source for the transimpedance amplifier.

Further features of optoelectronic circuits 100 and 200 are described in more detail below in reference to several specific illustrative embodiments. These embodiments may differ from one another, e.g., in the value of N and/or the number of distinct delay values in the set $T=\{T_1, T_2, ..., T_N\}$.

In a first illustrative embodiment, optical splitter 110 may be configured to generate signal copies $112_1$-$112_N$ of equal intensity $p_0$, and optical-delay bank 130 is configured such that the set $T=\{\tau_1, \tau_2, ..., \tau_N\}$ has N distinct delay values defined by Eq. (2):

$$\tau_n = n\tau_0 \qquad (2)$$

where $\tau_0$ is a constant. In this embodiment, output signal 152 can be approximately described by Eq. (3):

$$V_{152} = Z_0 p_0 \eta(-a_1 \exp(-j\omega\tau_0) + a_2 \exp(-j2\omega\tau_0) - a_3 \exp(-j3\omega\tau_0) + a_4 \exp(-j4\omega\tau_0) - \ldots - a_{N-1} \exp(-j(N-1)\omega\tau_0) + a_N \exp(-jN\omega\tau_0)) \qquad (3)$$

where $\eta$ is the nominal responsivity of each of photodiodes $PD_1$-$PD_N$; $\omega$ is the angular frequency; and $a_n$ is the signal-attenuation factor ($0 \leq a_n < 1$) imposed by optical attenuator $A_n$ in array 120. After substituting $z = \exp(j\omega\tau_0)$ into Eq. (3) and renormalizing the resulting formula by factoring out some common factors, one finds that the right side of Eq. (3) can be expressed using function H(z) given by Eq. (4):

$$H(z) = -a_1 + a_2 z^{-1} - a_3 z^{-2} + a_4 z^{-3} - \ldots - a_{N-1} z^{-N+2} + a_N z^{-N+1} \quad (4)$$

An alternative mathematical expression for the function H(z) can be obtained by normalizing the right part of Eq. (4) by dividing it by $-a_1$. This type of normalization results in the first term of the normalized function H(z) to be one.

A person of ordinary skill in the art will recognize that Eq. (4) (or its normalized version) describes a z-transform of an FIR filter having (N−1) uniformly spaced taps, wherein the sign of the tap coefficients alternates from one tap to the immediate next tap. It means that the first embodiment of circuit 100 can be used as an FIR filter whose transfer function has this specific (i.e., sign-alternating) property of its tap coefficients. The sign of each particular tap coefficient is fixed, being either negative or positive. However, the absolute value of each tap coefficient can be changed, as appropriate or necessary, e.g., by individually tuning each of optical attenuators $A_1$-$A_N$ in array 120 (see FIG. 1).

Note that an FIR filter implemented using circuits 100 and 200 has its delay and signal-weighting elements operating in the optical domain (see optical elements 120 and 130, FIG. 1), whereas the weighted-signal adder operates in the electrical domain (see electrical signal combiner 150, FIG. 1). In contrast, a conventional FIR filter has all of these three main FIR-filter elements operating in the same domain, either optical or electrical.

In a second illustrative embodiment, optical splitter 110 may be configured to generate signal copies $112_1$-$112_N$ of equal intensity $p_0$, where N is even; and optical-delay bank 130 is configured such that the set $T = \{\tau_1, \tau_2, \ldots, \tau_N\}$ has N/2 distinct delay values defined by Eqs. (5a)-(5b):

$$\tau_{2k+1} = (2k+1)\tau_0 \quad (5a)$$

$$\tau_{2(k+1)} = (2k+1)\tau_0 \quad (5b)$$

where k=0, 1, 2, ..., 0.5N−1, and $\tau_0$ is a constant. In this embodiment, circuit 100 can operate as an FIR filter whose transfer function is represented by the following z-transform:

$$H(z) = (-a_1 + a_2) + (-a_3 + a_4)z^{-1} + (-a_5 + a_6)z^{-2} + \ldots + (-a_{N-1} + a_N)z^{-(0.5N-1)} \quad (6)$$

This particular FIR filter has (0.5N−1) uniformly spaced taps. Both the sign and absolute value of each tap coefficient in this FIR filter can be changed by appropriately tuning optical attenuators $A_1$-$A_N$ in array 120 (see FIG. 1). For example, the sign of the zero-order tap coefficient ($=-a_1+a_2$) in this FIR filter can be changed by appropriately tuning optical attenuators $A_1$ and $A_2$. More specifically, the zero-order tap coefficient is positive when optical attenuators $A_1$ and $A_2$ are tuned such that $a_1 < a_2$, and negative when optical attenuators $A_1$ and $A_2$ are tuned such that $a_1 > a_2$. Similarly, the sign of the first-order tap coefficient ($=-a_3+a_4$) in this FIR filter can be changed by appropriately tuning optical attenuators $A_3$ and $A_4$. More specifically, the first tap coefficient is positive when $a_3 < a_4$, and negative when $a_3 > a_4$. The sign of the second-order tap coefficient ($=-a_5+a_6$) in this FIR filter can be changed by appropriately tuning optical attenuators $A_5$ and $A_6$, and so on.

Figure 3:
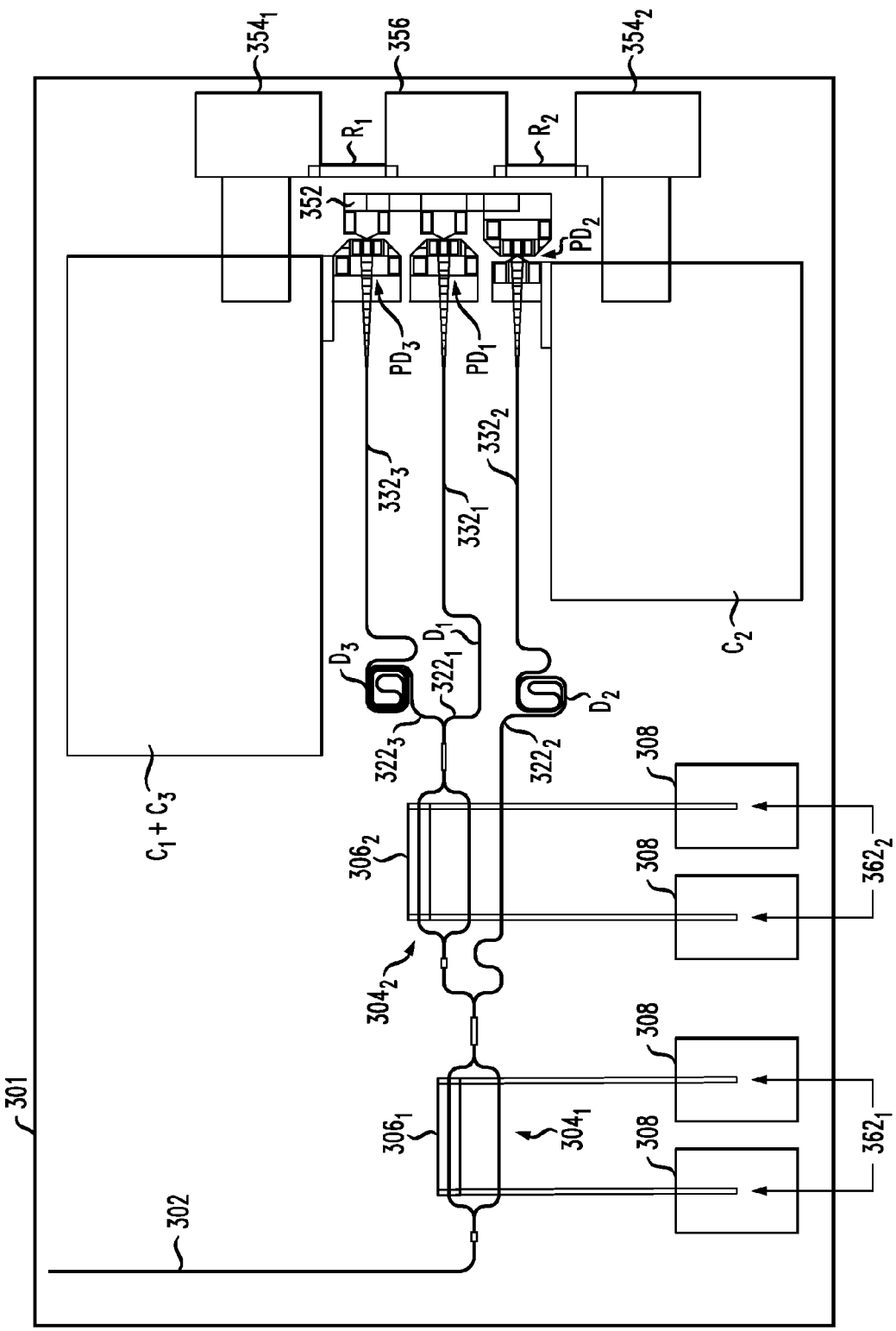
FIG. 3 shows a top view of an integrated optoelectronic circuit according to another embodiment of the disclosure.

FIG. 3 shows a top view of an integrated optoelectronic circuit 300 according to another embodiment of the disclosure. Circuit 300 may be considered as an embodiment of circuit 100 (FIG. 1) corresponding to N=3. All components of circuit 300 may be fabricated on a common planar substrate 301 using a silicon photonic technology.

Circuit 300 has an input waveguide 302 configured to feed light into an optical-waveguide structure comprising two optical-waveguide Mach-Zehnder interferometers (MZI's) $304_1$ and $304_2$ interconnected as indicated in FIG. 3. The three output waveguides of this optical-waveguide structure are labeled $322_1$-$322_3$, respectively. One arm of MZI $304_1$ has a thermoelectric phase shifter $306_1$. One arm of MZI $304_2$ similarly has a thermoelectric phase shifter $306_2$.

The relative intensity of light in waveguides $322_1$-$322_3$ can be changed by appropriately tuning phase shifters $306_1$ and $306_2$, which can be accomplished by changing their respective temperatures using control signals $362_1$ and $362_2$. In an example embodiment, a control signal 362 may be an externally generated voltage applied to a respective pair of electrical-contact pads 308 and configured to resistively heat the respective phase shifter 306. The generated heat changes the temperature of the phase shifter, which alters the index of refraction of the underlying optical waveguide, thereby changing the optical phase shift accumulated in the waveguide by the propagating light. A change in the optical phase shifts generated in phase shifters $306_1$ and $306_2$ can cause a change in the relative intensity of light in waveguides $322_1$-$322_3$ because these optical phase shifts affect the interference patterns of the light beams that reach each of those waveguides through the different optical paths provided by the optical-waveguide structure between waveguide 302 and waveguides $322_1$-$322_3$. Thus, the optical-waveguide structure located between waveguide 302 and waveguides $322_1$-$322_3$ is configured to operate both as an optical splitter analogous to optical splitter 110 (FIG. 1) and as a variable attenuator analogous to attenuator array 120 (FIG. 1).

Each of waveguides $322_1$-$322_3$ is connected to a respective one of waveguides $332_1$-$332_3$ via a respective one of fixed delay lines $D_1$-$D_3$. Each of delay lines $D_1$-$D_3$ comprises a different respective length of optical waveguide. The waveguides in delay lines $D_2$ and $D_3$ are arranged in a double-spiral pattern to reduce the substrate-surface area taken up by those delay lines. Delay line $D_1$ has the shortest length among the three delay lines and, as such, imposes the shortest delay time. Delay line $D_3$ has the longest length among the three delay lines and, as such, imposes the longest delay time. In an example embodiment, the delay times imposed by delay lines $D_1$-$D_3$ are $\tau_1$, $\tau_1 + \tau_0$, and $\tau_1 + 2\tau_0$, respectively. In some embodiments, $\tau_1 = \tau_0$. In some embodiments, $\tau_0$ may have the value of 4 ps.

Waveguides $332_1$-$332_3$ are configured to feed light into photodiodes $PD_1$-$PD_3$, respectively. A relatively large capacitor labeled $C_1 + C_3$ that is electrically connected between a first ground terminal $354_1$ and photodiodes $PD_1$ and $PD_3$ is configured to provide an RF ground to these two photodiodes. A smaller capacitor labeled $C_2$ is similarly electrically connected between a second ground terminal $354_2$ and photodiode $PD_2$ to provide an RF ground to this photodiode. The ground terminals $354_1$ and $354_2$ are also electrically connected to an output terminal 356 via resistors $R_1$ and $R_2$, respectively. Output terminal 356 is electrically connected to photodiodes $PD_1$-$PD_3$ via a common electrical line 352.

Note that photodiodes $PD_1$ and $PD_3$ have the same orientation on substrate 301, whereas the orientation of photodiode $PD_2$ is different by 180 degrees. Common electrical line 352 is connected to electrical contacts located at the right side (in the view shown in FIG. 3) of photodiodes PD$_1$-PD$_3$. Due to the orientation difference between the photodiodes, the photocurrents generated by photodiodes PD$_1$ and PD$_3$ and the photocurrent generated by photodiode PD$_2$ are picked up by common electrical line 352 and applied to output terminal 356 with opposite polarities.

A person of ordinary skill in the art will recognize that circuit 300 can operate as an FIR filter whose transfer function is represented by the following z-transform:

$$H(z)=1-\beta_1 z^{-1}+\beta_2 z^{-2} \qquad (7)$$

where $\beta_1=a_2/a_1$, and $\beta_2=a_3/a_1$. Note that, in this z-transform, the zero-order and second-order tap coefficients are positive, whereas the first-order tap coefficient is negative. The signs of the tap coefficients are fixed and do not change when phase shifters 306$_1$ and 306$_2$ are tuned.

Figure 4:
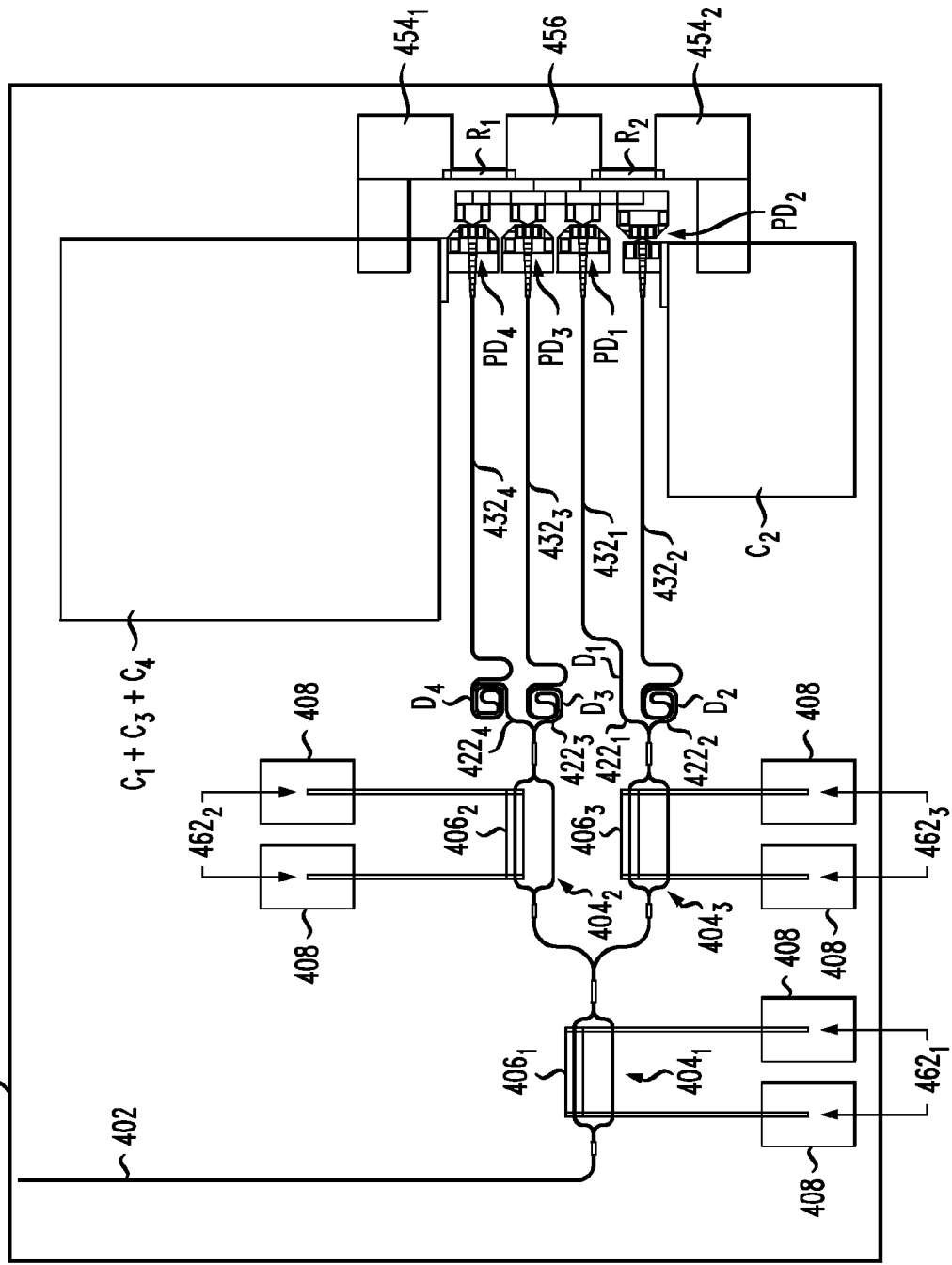
FIG. 4 shows a top view of an integrated optoelectronic circuit according to yet another embodiment of the disclosure.

FIG. 4 shows a top view of an integrated optoelectronic circuit 400 according to yet another embodiment of the disclosure. Circuit 400 may be considered as an embodiment of circuit 100 (FIG. 1) corresponding to N=4. All components of circuit 400 may be fabricated on a common planar substrate 401 using a silicon photonic technology.

Circuit 400 has an input waveguide 402 configured to feed light into an optical-waveguide structure comprising three optical-waveguide MZI's 404$_1$-404$_3$ interconnected as indicated in FIG. 4. The four output waveguides of this optical-waveguide structure are labeled 422$_1$-422$_4$, respectively. One arm of each MZI 404 has a respective thermoelectric phase shifter 406.

The relative intensity of light in waveguides 422$_1$-422$_4$ can be changed by appropriately tuning phase shifters 406$_1$-406$_3$ using control signals 462$_1$-462$_3$, respectively. In an example embodiment, a control signal 462 may be an externally generated voltage applied to a respective pair of electrical-contact pads 408 and configured to resistively heat the respective phase shifter 406. Similar to the optical-waveguide structure located between waveguide 302 and waveguides 322$_1$-322$_3$ in circuit 300 (FIG. 3), the optical-waveguide structure located between waveguide 402 and waveguides 422$_1$-422$_4$ in circuit 400 is configured to operate both as an optical splitter analogous to optical splitter 110 (FIG. 1) and as a variable attenuator analogous to attenuator array 120 (FIG. 1).

Each of waveguides 422$_1$-422$_4$ is connected to a respective one of waveguides 432$_1$-432$_4$ via a respective one of fixed delay lines D$_1$-D$_4$. Each of delay lines D$_1$-D$_4$ comprises a respective length of optical waveguide. The waveguides in delay lines D$_2$, D$_3$, and D$_4$ are arranged in a double-spiral pattern. Delay line D$_1$ has the shortest length among the four delay lines and, as such, imposes the shortest delay time. Delay lines D$_2$ and D$_3$ have the same nominal length. Delay line D$_4$ has the longest length among the four delay lines and, as such, imposes the longest delay time. In an example embodiment, the delay times imposed by delay lines D$_1$-D$_4$ are $\tau_1$, $\tau_1+\tau_0$, $\tau_1+\tau_0$, and $\tau_1+2\tau_0$, respectively.

Waveguides 432$_1$-432$_4$ are configured to feed light into photodiodes PD$_1$-PD$_4$, respectively. A relatively large capacitor labeled C$_1$+C$_3$+C$_4$ that is electrically connected between a first ground terminal 454$_2$ and photodiodes PD$_1$, PD$_3$, and PD$_4$ is configured to provide an RF ground to these three photodiodes. A smaller capacitor labeled C$_2$ is similarly electrically connected between a second ground terminal 454$_2$ and photodiode PD$_2$ to provide an RF ground to this photodiode. The ground terminals 454$_2$ and 454$_2$ are also electrically connected to an output terminal 456 via resistors R$_1$ and R$_2$, respectively. Output terminal 456 is electrically connected to photodiodes PD$_1$-PD$_4$ via a common electrical line 452.

Note that photodiodes PD$_1$, PD$_3$, and PD$_4$ have the same orientation on substrate 401, whereas the orientation of photodiode PD$_2$ is different by 180 degrees. Common electrical line 452 is connected to electrical contacts located at the right side (in the view shown in FIG. 4) of photodiodes PD$_1$-PD$_4$. Due to the orientation difference between the photodiodes, the photocurrents generated by photodiodes PD$_1$, PD$_3$, and PD$_4$ and the photocurrent generated by photodiode PD$_2$ are picked up by common electrical line 452 and applied to output terminal 456 with opposite polarities.

A person of ordinary skill in the art will recognize that circuit 400 can operate as an FIR filter whose transfer function is represented by the following z-transform:

$$H(z)=1+(\beta_2-\beta_1)z^{-1}+\beta_3 z^{-2} \qquad (8)$$

where $\beta_1=a_2/a_1$, $\beta_2=a_3/a_1$, and $\beta_3=a_4/a_1$. Note that, in this z-transform, the zero-order and second-order tap coefficients are positive, whereas the first-order tap coefficient may be either positive or negative. More specifically, the first-order tap coefficient is positive when $\beta_2>\beta_1$, and negative when $\beta_2<\beta_1$. The sign of the first-order tap coefficient may be changed by appropriately tuning phase shifters 406$_1$-406$_3$.

According to an example embodiment disclosed above in reference to FIGS. 1-4, provided is an apparatus (e.g., 100, FIG. 1) comprising: an optical splitter (e.g., 110, FIG. 1) having an optical input port (e.g., for 102, FIG. 1) and a plurality of optical output ports (e.g., for 112$_2$-112$_N$, FIG. 1); an array (e.g., 120, FIG. 1) of variable optical-gain elements (e.g., A$_1$-A$_N$, FIG. 1), each coupled to a respective one of the optical output ports and configured to generate a respective attenuated or amplified light beam (e.g., 122$_2$-122$_N$, FIG. 1); a bank (e.g., 130, FIG. 1) of optical delay elements (e.g., D$_1$-D$_N$, FIG. 1), each connected to a respective one of the variable optical-gain elements and configured to delay the respective attenuated or amplified light beam by a respective delay time to produce a respective delayed light beam (e.g., 132$_2$-132$_N$, FIG. 1), wherein a set of the respective delay times has at least three different values (e.g., $\tau_1$, $\tau_1+\tau_0$, and $\tau_1+2\tau_0$); an array (e.g., 140, FIG. 1) of photodetectors (e.g., PD$_1$-PD$_N$, FIG. 1), each coupled to receive light from a respective one of the optical delay elements and configured to convert the respective delayed light beam into a respective electrical signal (e.g., 142$_2$-142$_N$, FIG. 1); and an electrical signal combiner (e.g., 150, FIG. 1) configured to combine the respective electrical signals to generate an electrical output signal (e.g., 152, FIG. 1) in a manner that causes a first subset of the photodetectors and a second subset of the photodetectors to contribute the respective electrical signals to the electrical output signal with opposite polarities.

According to another example embodiment disclosed above in reference to FIGS. 1-4, provided is an apparatus (e.g., 100, FIG. 1) comprising: an array (e.g., 140, FIG. 1) of photodetectors (e.g., PD$_1$-PD$_N$, FIG. 1); an optical splitter (e.g., 110, FIG. 1) having an optical input port (e.g., for 102, FIG. 1) and a plurality of optical output ports (e.g., for 112$_1$-112$_N$, FIG. 1), with each of the optical output ports being connected to illuminate a respective one of the photodetectors in the array of photodetectors; a bank (e.g., 130, FIG. 1) of optical delay elements (e.g., D$_1$-D$_N$, FIG. 1), with each of the optical delay elements being coupled between a respective one of the optical output ports and the respective one of the photodetectors such that light of each of the optical output ports passes through a respective one of the optical delay elements; and an array (e.g., 120, FIG. 1) of variable optical-gain elements (e.g., A$_1$-A$_N$, FIG. 1) coupled between the optical splitter and the array of photodetectors such that, for at least some of the optical output ports, the light also passes through a respective one of the variable optical-gain elements. Each photodetector in the array of photodetectors is configured to convert received light into a respective electrical signal. The apparatus further comprises an electrical signal combiner (e.g., 150, FIG. 1) configured to combine the respective electrical signals to generate an electrical output signal (e.g., 152, FIG. 1) in a manner that causes a first subset of the photodetectors and a second subset of the photodetectors to contribute the respective electrical signals to the electrical output signal with opposite polarities.

In some embodiments of the above apparatus, the array of photodetectors comprises three photodiodes (e.g., $PD_1$-$PD_3$, FIG. 3).

In some embodiments of any of the above apparatus, the array of variable optical-gain elements comprises one or more variable optical attenuators or one or more variable-gain optical amplifiers (e.g., $A_1$-$A_N$, FIG. 1).

In some embodiments of any of the above apparatus, the array of photodetectors comprises four photodiodes (e.g., $PD_1$-$PD_4$, FIG. 4).

In some embodiments of any of the above apparatus, the optical splitter is an optical power splitter configured to split light applied to the optical input port into a plurality of optical beams of substantially (e.g., within 10%) equal intensities and output each of said optical beams through a respective one of the optical output ports.

In some embodiments of any of the above apparatus, the optical splitter and the array of variable optical-gain elements are implemented as an optical circuit that comprises two or more Mach-Zehnder interferometers (e.g., 406, FIG. 4).

In some embodiments of any of the above apparatus, two Mach-Zehnder interferometers (e.g., 406$_1$ and 406$_2$, FIG. 4) of the two or more Mach-Zehnder interferometers are serially connected with one another.

In some embodiments of any of the above apparatus, two Mach-Zehnder interferometers (e.g., 406$_3$ and 406$_2$, FIG. 4) of the two or more Mach-Zehnder interferometers are connected in parallel with one another.

In some embodiments of any of the above apparatus, at least one optical delay element in the bank of optical delay elements is tunable (e.g., under control of 164, FIG. 1) to change its respective delay time.

In some embodiments of any of the above apparatus, the apparatus further comprises an electronic controller (e.g., 160, FIG. 1) operatively coupled to the array of variable optical-gain elements and the bank of optical delay elements and configured to: cause at least one of the variable optical-gain elements to change an amount of light attenuation or amplification therein; and cause at least one optical delay element in the bank of optical delay elements to change the respective delay time.

In some embodiments of any of the above apparatus, the bank of optical delay elements includes a first optical delay element (e.g., $D_2$, FIG. 4) and a second optical delay element (e.g., $D_3$, FIG. 4) that are configured to delay the light by the respective delay times that are nominally identical to one another.

In some embodiments of any of the above apparatus, the array of photodetectors comprises a first photodetector (e.g., $PD_2$, FIG. 4) coupled to receive light through the first optical delay element, and a second photodetector (e.g., $PD_3$, FIG. 4) coupled to receive light through the second optical delay element.

In some embodiments of any of the above apparatus, the first photodetector belongs to the first subset of the photodetectors, and the second photodetector belongs to the second subset of the photodetectors.

In some embodiments of any of the above apparatus, each of the optical delay elements is configured to delay the light by a respective delay time, wherein a set of the respective delay times has at least three different values.

In some embodiments of any of the above apparatus, the set of the respective delay times includes the following values:

$$\tau_n = \tau_1 + (n-1)\tau_0,$$

where $\tau_n$ is the respective delay time of an n-th delay element in the bank of optical delay elements; and $\tau_1$ and $\tau_0$ are constants.

In some embodiments of any of the above apparatus, the optical splitter, the array of variable optical-gain elements, the bank of optical delay elements, the array of photodetectors, and the electrical signal combiner are fabricated on a common substrate (e.g., 401, FIG. 4) to form an integrated optoelectronic circuit (e.g., 400, FIG. 4).

In some embodiments of any of the above apparatus, the apparatus is configured to operate as a finite-impulse-response filter that is configured to: variously delay two or more copies of an optical input signal received at the optical input port using the bank of optical delay elements to generate a plurality of filter-tap signals; individually weight the filter-tap signals using the array of variable optical-gain elements to generate a plurality of weighted signals; and sum the weighted signals using the electrical signal combiner to generate the electrical output signal.

In some embodiments of any of the above apparatus, at least one of a plurality of tap coefficients applied to weight the filter-tap signals is positive, and at least one of the plurality of tap coefficients applied to weight the filter-tap signals is negative (e.g., as indicated in Eq. (4)).

In some embodiments of any of the above apparatus, at least one of a plurality of tap coefficients applied to weight the filter-tap signals is variable between a positive value and a negative value (e.g., as indicated in Eq. (8)).

In some embodiments of any of the above apparatus, the bank of optical delay elements is configured to cause the finite-impulse-response filter to have equally spaced taps (e.g., as indicated in Eq. (2) or Eq. (5)).

In some embodiments of any of the above apparatus, the apparatus further comprises an electronic controller (e.g., 160, FIG. 1) operatively coupled to the array of variable optical-gain elements and configured to cause the electrical output signal to be equalized to at least partially compensate an effect of a transmission impairment imposed onto the optical input signal.

In some embodiments of any of the above apparatus, the transmission impairment includes one or more of: (i) chromatic dispersion; (ii) polarization-mode dispersion; (iii) inter-symbol interference, and (iv) narrow-passband filtering.

According to yet another example embodiment disclosed above in reference to FIGS. 1-4, provided is an apparatus (e.g., 100, FIG. 1) comprising: an optical splitter (e.g., 110, FIG. 1) having an optical input port (e.g., for 102, FIG. 1) and first and second optical output ports (e.g., for 112$_1$-112$_2$, FIG. 1); a first variable optical-gain element (e.g., $A_1$, FIG. 1) coupled to receive light from the first optical output port and configured to generate a first attenuated or amplified light beam (e.g., 122$_1$, FIG. 1); a second variable optical-gain element (e.g., $A_2$, FIG. 1) coupled to receive light from the second optical output port and configured to generate a second attenuated or amplified light beam (e.g., $122_2$, FIG. 1); a first optical delay element (e.g., $D_1$, FIG. 1) configured to delay the first attenuated light beam by a first delay time to produce a first delayed light beam (e.g., $132_1$, FIG. 1); a second optical delay element (e.g., $D_2$, FIG. 1) configured to delay the second attenuated light beam by the first delay time to produce a second delayed light beam (e.g., $132_2$, FIG. 1); a first photodetector (e.g., $PD_1$, FIG. 1) configured to convert the first delayed light beam into a first electrical signal (e.g., $142_1$, FIG. 1); a second photodetector (e.g., $PD_2$, FIG. 1) configured to convert the second delayed light beam into a second electrical signal (e.g., $142_2$, FIG. 1); and an electrical circuit (e.g., 150, FIG. 1) configured to generate an electrical output signal (e.g., 152, FIG. 1) using the first and second electrical signals, wherein the first and second electrical signals are combined with opposite polarities; and wherein the first and second variable optical-gain elements are tunable such that a combined contribution of the first and second electrical signals into the electrical output signal is variable between being positive and being negative (e.g., as indicated in Eq. (8)).

While this disclosure includes references to illustrative embodiments, this specification is not intended to be construed in a limiting sense.

As used in the claims, the term "variable optical-gain element" should be construed to cover both a variable optical attenuator and a variable-gain optical amplifier.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "controllers" and "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
   an array of photodetectors;
   an optical splitter having an optical input port and a plurality of optical output ports, with each of the optical output ports being connected to illuminate a respective one of the photodetectors in the array of photodetectors;
   a bank of optical delay elements, with each of the optical delay elements being coupled between a respective one of the optical output ports and the respective one of the photodetectors such that light of each of the optical output ports passes through a respective one of the optical delay elements; and an array of variable optical-gain elements coupled between the optical splitter and the array of photodetectors such that, for at least some of the optical output ports, the light also passes through a respective one of the variable optical-gain elements;

wherein each photodetector in the array of photodetectors is configured to convert received light into a respective electrical signal;

wherein the apparatus further comprises an electrical signal combiner configured to combine the respective electrical signals to generate an electrical output signal in a manner that causes a first subset of the photodetectors and a second subset of the photodetectors to contribute the respective electrical signals to the electrical output signal with opposite polarities; and wherein the apparatus further comprises an electronic controller operatively coupled to the bank of optical delay elements and configured to cause at least one optical delay element in the bank of optical delay elements to change a respective delay time.

2. The apparatus of claim 1, wherein the array of variable optical-gain elements comprises one or more variable optical attenuators or one or more variable-gain optical amplifiers.

3. The apparatus of claim 1, wherein the array of photodetectors comprises three photodiodes.

4. The apparatus of claim 1, wherein the optical splitter is an optical power splitter configured to split light applied to the optical input port into a plurality of optical beams of substantially equal intensities and output each of said optical beams through a respective one of the optical output ports.

5. The apparatus of claim 1, wherein the optical splitter and the array of variable optical-gain elements are implemented as an optical circuit that comprises two or more Mach-Zehnder interferometers.

6. The apparatus of claim 5, wherein two Mach-Zehnder interferometers of the two or more Mach-Zehnder interferometers are serially connected with one another.

7. The apparatus of claim 5, wherein two Mach-Zehnder interferometers of the two or more Mach-Zehnder interferometers are connected in parallel with one another.

8. The apparatus of claim 1, wherein the electronic controller is further operatively coupled to the array of variable optical-gain elements and further configured to cause at least one of the variable optical-gain elements to change an amount of light amplification therein.

9. The apparatus of claim 1, wherein the bank of optical delay elements includes a first optical delay element and a second optical delay element that are configured to delay the light by respective delay times that are nominally identical to one another.

10. The apparatus of claim 9,
wherein the array of photodetectors comprises a first photodetector coupled to receive light through the first optical delay element and a second photodetector coupled to receive light through the second optical delay element; and
wherein the first photodetector belongs to the first subset of the photodetectors, and the second photodetector belongs to the second subset of the photodetectors.

11. The apparatus of claim 1, wherein each of the optical delay elements is configured to delay the light by a respective delay time, wherein a set of the respective delay times has at least three different values.

12. The apparatus of claim 11, wherein the set of the respective delay times includes the following values:

$$\tau_n = \tau_1 + (n-1)\tau_0,$$

where $\tau_n$ is the respective delay time of an n-th delay element in the bank of optical delay elements; and $\tau_1$ and $\tau_0$ are constants.

13. The apparatus of claim 1, wherein the apparatus is configured to operate as a finite-impulse-response filter that is configured to:
variously delay two or more copies of an optical input signal received at the optical input port using the bank of optical delay elements to generate a plurality of filter-tap signals;
individually weight the filter-tap signals using the array of variable optical-gain elements to generate a plurality of weighted signals; and
sum the weighted signals using the electrical signal combiner to generate the electrical output signal.

14. The apparatus of claim 13, wherein at least one of a plurality of tap coefficients applied to weight the filter-tap signals is positive, and at least one of the plurality of tap coefficients applied to weight the filter-tap signals is negative.

15. The apparatus of claim 13, wherein at least one of a plurality of tap coefficients applied to weight the filter-tap signals is variable between a positive value and a negative value.

16. The apparatus of claim 13, wherein the bank of optical delay elements is configured to cause the finite-impulse-response filter to have equally spaced taps.

17. An apparatus comprising:
an array of photodetectors;
an optical splitter having an optical input port and a plurality of optical output ports, with each of the optical output ports being connected to illuminate a respective one of the photodetectors in the array of photodetectors;
a bank of optical delay elements, with each of the optical delay elements being coupled between a respective one of the optical output ports and the respective one of the photodetectors such that light of each of the optical output ports passes through a respective one of the optical delay elements; and
an array of variable optical-gain elements coupled between the optical splitter and the array of photodetectors such that, for at least some of the optical output ports, the light also passes through a respective one of the variable optical-gain elements;

wherein each photodetector in the array of photodetectors is configured to convert received light into a respective electrical signal;

wherein the apparatus further comprises an electrical signal combiner configured to combine the respective electrical signals to generate an electrical output signal in a manner that causes a first subset of the photodetectors and a second subset of the photodetectors to contribute the respective electrical signals to the electrical output signal with opposite polarities; and wherein the optical splitter and the array of variable optical-gain elements are implemented as an optical circuit that comprises two or more Mach-Zehnder interferometers.

18. The apparatus of claim 17, wherein two Mach-Zehnder interferometers of the two or more Mach-Zehnder interferometers are serially connected with one another.

19. The apparatus of claim 17, wherein two Mach-Zehnder interferometers of the two or more Mach-Zehnder interferometers are connected in parallel with one another.

20. An apparatus comprising:

an array of photodetectors;

an optical splitter having an optical input port and a plurality of optical output ports, with each of the optical output ports being connected to illuminate a respective one of the photodetectors in the array of photodetectors;

a bank of optical delay elements, with each of the optical delay elements being coupled between a respective one of the optical output ports and the respective one of the photodetectors such that light of each of the optical output ports passes through a respective one of the optical delay elements; and an array of variable optical-gain elements coupled between the optical splitter and the array of photodetectors such that, for at least some of the optical output ports, the light also passes through a respective one of the variable optical-gain elements;

wherein each photodetector in the array of photodetectors is configured to convert received light into a respective electrical signal;

wherein the apparatus further comprises an electrical signal combiner configured to combine the respective electrical signals to generate an electrical output signal in a manner that causes a first subset of the photodetectors and a second subset of the photodetectors to contribute the respective electrical signals to the electrical output signal with opposite polarities;

wherein each of the optical delay elements is configured to delay the light by a respective delay time, wherein a set of the respective delay times has at least three different values; and wherein the set of the respective delay times includes the following values:

$$\tau_n = \tau_1 + (n-1)\tau_0,$$

where $\tau_n$ is the respective delay time of an n-th delay element in the bank of optical delay elements; and $\tau_1$ and $\tau_0$ are constants.

* * * * *